3,414,587
4 - (1,2,3,4,5,6,7,8 - OCTAHYDRO - 1,8 - DIOXO - 9-
XANTHENYL)-BENZENE-SULFONAMIDE AND
DERIVATIVES
Hanns Hanina Lehr, Montclair, and Milan Mitrovic,
Nutley, N.J., assignors to Hoffmann-La Roche Inc.,
Nutley, N.J., a corporation of New Jersey
No Drawing. Filed Nov. 9, 1965, Ser. No. 507,053
8 Claims. (Cl. 260—335)

ABSTRACT OF THE DISCLOSURE

Anthelmintic 4-(1,2,3,4,5,6,7,8-octahydro - 1,8 - dioxo-9-xanthenyl)-benzenesulfonamide and derivatives are prepared by condensation of p-sulfamoylbenzaldehyde with a 1,3-cyclohexanedione or with a 5,5-di-lower alkyl-1,3-cyclohexanedione.

This application relates to the condensation of p-sulfamoyl-benzaldehyde with 1,3-cyclohexanedione or with 5,5-di-lower alkyl-substituted-1,3-cyclohexanedione. More particularly, the process of this invention can be traced with respect to the following schematic diagram.

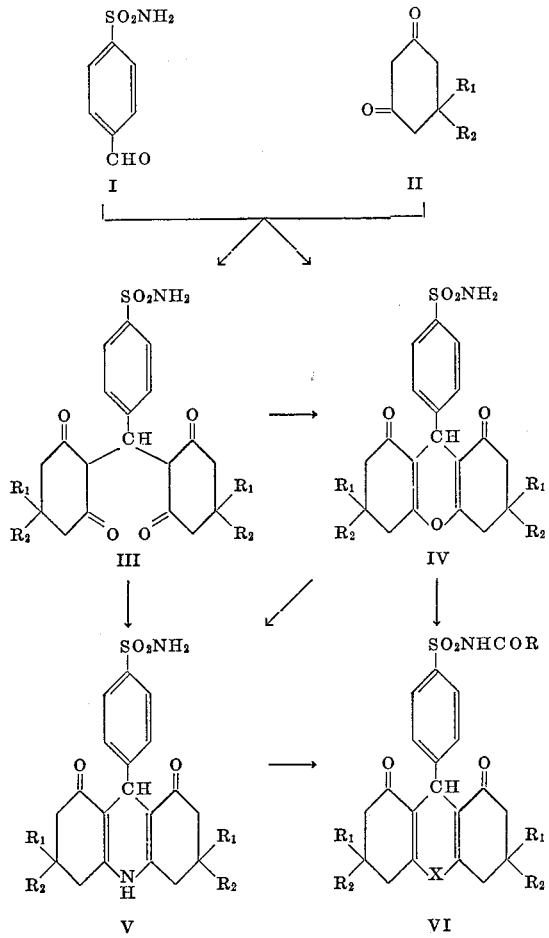

In Formula VI above the symbol R represents lower alkyl or phenyl; $R_1$ and $R_2$ are each independently selected from the group consisting of hydrogen and lower alkyl; and X is oxygen or

Like symbols in Formulas II through V have like meanings.

The condensation products represented by Formulas IV and V and the acylated derivatives thereof represented by Formula VI have not been previously disclosed in the art. The intermediates of Formula III are also novel compounds and thus constitute a part of this invention.

As illustrated by the schematic diagram above, condensation of p-sulfamoylbenzaldehyde with a 1,3-cyclohexanedione of Formula II gives directly the novel xanthenylbenzenesulfonamide of Formula IV. 5,5-di-lower alkyl-1,3-cyclohexandiones suitable for use as starting materials are, for example, the 5,5-dimethyl-, 5,5-diethyl-, 5-methyl-5-ethyl- derivatives and the like. The condensation reaction is suitably carried out at a slightly elevated temperature, i.e., at a temperature between about room temperature and about 100° C. The condensation can be conveniently effected in the presence of glacial acetic acid or in any inert solvent, suitably in an aqueous solvent. The amounts of reactants employed are not critical, though to assure optimum yields, it is preferred to utilize at least 2 moles of the cyclohexanedione per mole of sulfamoylbenzaldehyde.

The acridanyl benzenesulfonamides of Formula V are prepared from the corresponding compounds of Formula III or IV by treatment with ammonia. The treatment with ammonia is suitably effected at an elevated temperature, i.e., a temperature between about room temperature and about 100° or higher and at an elevated pressure. Suitably the reaction is carried out in a pressure vessel, i.e., an autoclave.

As illustrated by the schematic diagram above, the compounds of Formulas IV and V are also accessible by an alternative route via the novel intermediates of Formula III. When the condensation reaction is carried out under mild conditions, e.g., room temperature in aqueous alkanol, e.g., ethanol, etc., the intermediates of Formula III can be isolated from the reaction product. Compounds of Formula III are readily converted to compounds of Formula IV by dehydration, for example, by heating with or without a dehydrating agent such as sulfuric acid, polyphosphoric acid, acetic anhydride and the like. Compounds of Formula V can be obtained directly by treatment of the corresponding Formula III intermediates with ammonia at elevated temperature and pressures. The conversion of intermediates of Formula III to the corresponding xanthenyl derivatives of Formula IV can be accomplished either by treating the intermediate formed in situ or by isolating the intermediate and subsequently converting it to the novel end products. The acylated derivaties of Formula VI are prepared by treating the corresponding Formula IV or Formula V compound with any of the ordinary acylating agents such as, for example, alkanoic anhydrides, e.g., acetic anhydride, etc.; acyl halides, such as alkanoyl halides, e.g., acetyl chloride, propionyl chloride, etc., aroyl halides, e.g., benzoyl chloride, etc.

The novel compounds of Formula VI are useful in combating helmintic pathogens such as *A. galli, H. gallinae,* etc. More particularly, the compounds have been found to possess larvicidal and larvistatic activity against *A. galli* and therefore are especially useful in the prophylactic treatment of helminthiasis. The compounds of the present invention are effective when administered via poultry feed at levels from about 0.0025 percent to about 0.1 percent by weight of feed stock. Higher levels can of course be employed. The novel compounds of this invention can be administered to poultry orally as a component to the feed or the drinking water. This can be accomplished by dispensing the compound in either a liquid or solid injestible. Conveniently, the drug can be administered by incorporating into feed rations such amounts as will provide a daily minimum intake sufficient to provide helmintic prophylaxis. These compounds can be, for example, combined with such feed elements as corn meal, ordinary grain, mash, scratch and other normal or commercial feed rations which may also contain additional substances such as chemotherapeutic and antibiotic agents compatible with the anthelmintic compounds of this invention, for example, the anthelmintics of this invention could be combined with compatible coccidiostats for combined anthelmintic anti-coccidiosis treatment.

The compounds of this invention can be converted to their base salts and such salts with pharmaceutically acceptable bases are also included in this invention. Suitable bases are, for example, alkaline metal hydroxides, e.g., sodium hydroxide, etc.

The following examples are illustrative of the invention. All temperatures are in degrees centigrade.

Example 1.—Preparation of 4-(1,2,3,4,5,6,7,8-octahydro-3,3,6,6 - tetramethyl - 1,8 - dioxo-9-xanthenyl)benzenesulfonamide Twenty-eight grams of p-sulfamoylbenzaldehyde and 45 g. of 5,5-dimethyl-1,3-cyclohexanedione were suspended in 180 ml. of glacial acetic acid and the mixture was heated on the steambath for 18 hours. During the heating, a clear solution was obtained, followed by slow deposition of crystals. After cooling, the crystals were collected by filtration, washed with water, and air-dried. After recrystallization from ethanol-water, the product melted at 289–290° (dec.).

By an alternate method, a solution of 3.7 g. of p-sulfamoylbenzaldehyde in 50 ml. of hot water was added to a solution of 6 g. of 5,5-dimethyl-1,3-cyclohexanedione in 80 ml. of hot water. White solids precipitated immediately. The suspension was refluxed with stirring for 3 hours, and the product collected by filtration. After recrystallization from ethanol-water, the crystals melted at 288–290° (dec.).

Example 2.—Preparation of N-acetyl-4-(1,2,3,4,5,6,7,8-octahydro - 3,3,6,6-tetramethyl-1,8-dioxo-9-xanthenyl) benzenesulfonamide Fifty-seven grams of 4-(1,2,3,4,5,6,7,8-octahydro-3,3,6,6 - tetramethyl - 1,8-dioxo-9-xanthenyl)benzenesulfonamide was suspended in 570 ml. of acetic anhydride and the mixture refluxed for 5 hours. After about 2 hours a clear solution was obtained. The cooled solution was added slowly to 3 liters of ice water, and the slurry stirred for about 2–3 hours. The solids were collected by filtration, washed with water, and air-dried. The N-acetyl-4-(1,2,3,4,5,6,7,8 - octahydro - 3,3,6,6 - tetramethyl - 1,8-dioxo-9-xanthenyl)benzenesulfonamide thus obtained was recrystallized by dissolving it in one liter of hot 90% ethanol, treating the solution with activated charcoal, and adding 2 liters of water to the filtrate. The white crystalline product melted at 189–191°.

Example 3.—Preparation of 4-(1,2,3,4,5,6,7,8-octahydro-1,8-dioxo-9-xanthenyl)benzenesulfonamide Twelve grams of 1,3-cyclohexanedione and 9.2 g. of p-sulfamoylbenzaldehyde were dissolved in 65 ml. of glacial acetic acid and the solution heated on the steambath for 18 hours. After cooling, the precipitated crystals were collected by filtration, washed with water, and air-dried. After recrystallization from dimethylformamide-water, the product melted at 304–306° (dec.).

By an alternate method, 4.8 g. of 1,3-cyclohexanedione was added to a solution of 3.7 g. of p-sulfamoylbenzaldehyde in 55 ml. of hot water. After a few minutes solids precipitated, and the suspension was refluxed for 3 hours. The product was collected by filtration and recrystallized from dimethylformamide-water. M.P. 305–306° (dec.).

Example 4.—Preparation of $a,a$-bis(4,4-dimethyl-2,6-dioxocyclohexyl)-p-toluenesulfonamide To a solution of 11.2 g. of 5,5-dimethyl-1,3-cyclohexanedione in a mixture of 600 ml. of water and 100 ml. of ethanol was added a solution of p-sulfamoylbenzaldehyde in 100 ml. of ethanol. An additional 100 ml. of ethanol was added to achieve complete homogenization and the solution was allowed to stand at room temperature for 3 days. The crystals were collected by filtration, washed with water and dried under reduced pressure at 50°. After recrystallization from acetone-petroleum ether, $\alpha,\alpha$ - bis(4,4-dimethyl-2,6-dioxcyclohexyl)-p-toluenesulfonamide melted at 196–197° (dec.).

Example 5.—Preparation of 4-(1,2,3,4,5,6,7,8-octahydro-3,3,6,6 - tetramethyl - 1,8 - dioxo-9-acridanyl)benzenesulfonamide Ten grams of $\alpha,\alpha$-bis(4,4-dimethyl-2,6-dioxocyclohexyl) p-toluenesulfonamide was suspended in 150 ml. of methanol, the mixture was cooled to —20° and saturated with ammonia. The clear solution thus obtained was heated in an autoclave for 10 hours at 100°. On cooling, 5 g. of crystals were obtained and collected by filtration. Concentration of the mother liquors yielded additional crystals. After recrystallization from ethanol-water, 4-(1,2,3,4,5,6,7,8 - octahydro-3,3,6,6-tetramethyl-1-8-dioxo-9-acridanyl) benzenesulfonamide was obtained as yellow crystals melting at 305–308° (dec.).

Example 6.—Preparation of $\alpha,\alpha$-bis(2,6-dioxocyclohexyl)-p-toluenesulfonamide To a solution of 10.4 g. of 1,3-cyclohexanedione in 200 ml. of water was added a solution of 8 g. of p-sulfamoylbenzaldehyde in 100 m. of ethanol, and the mixture was allowed to stand at room temperature for 3 days. The crystals were collected by filtration, washed with water and dried under reduced pressure at 50° C. After recrystallization from dimethylformamide-water, $\alpha,\alpha$-bis-(2,6-dioxocyclohexyl)-p-toluenesulfonamide sintered at about 240° and melted at 303–304°.

Example 7.—Preparation of 4-(1,2,3,4,5,6,7,8-octahydro-1,8-dioxo-9-acridanyl)-benzenesulfonamide Ten grams of $\alpha,\alpha$-bis(2,6-dioxocyclohexyl)-p-toluenesulfonamide was suspended in 150 ml. of ethanol and the mixture was saturated with ammonia at —20°. The clear solution thus obtained was kept in an autoclave at room temperature for 60 hours. After removal of the solvent under reduced pressure, the residue was dissolved in a minimum of ethanol and filtered from some insolubles. To the clear filtrate was added water until turbidity and the solution was allowed to stand at room temperature for 24 hours. The crystals were collected by filtration, washed and dried under reduced pressure. From the mother liquors an additional amount of crystals was obtained. After recrystallization from dimethylformamide-water, the yellow crystals melted at 308–310° (dec.).

Example 8.—Preparation of $N^1$-acetyl-4-(1,2,3,4,5,6,7,8-octahydro - 3,3,6,6-tetramethyl-1,8-dioxo-9-acridanyl)-benzenesulfonamide Three grams of 4 - (1,2,3,4,5,6,7,8-octahydro-3,3,6,6-tetramethyl - 1,8 - dioxo-9-acridanyl)benzenesulfonamide was suspended in 40 ml. of acetic anhydride and the mixture was refluxed for 18 hrs. After cooling, the crystals were collected by filtration, washed and air-dried. After recrystallization from ethanol-water, the yellow crystalline product melted at 281–283° (dec.).

Example 9.—Preparation of N-acetyl-4-(1,2,3,4,5,6,7,8-octahydro-1,8-dioxo-9-xanthenyl)benzensulfonamide Seventeen grams of 4 - (1,2,3,4,5,6,7,8-octahydro-1,8-dioxo-9-xanthenyl)benzenesulfonamide was suspended in 170 ml. of acetic anhydride and the mixture was refluxed with stirring for 6 hours. After cooling, the crystals were collected by filtration and air-dried. After recrystallization from ethanol-water, the white crystalline product melted at 274–275° (dec.).

Example 10.—Preparation of N-propionyl-4-(1,2,3,4,5,6,7,8 - octahydro-3,3,6,6-tetramethyl-1,8-dioxo-9-xanthenyl)benzenesulfonamide Fifteen grams of 4-(1,2,3,4,5,6,7,8-octahydro-3,3,6,6-tetramethyl - 1,8 - dioxo-9-xanthenyl)benzenesulfonamide was suspended in 110 ml. of propionic anhydride and the mixture was heated at 150° for 6 hours. After cooling, the clear solution was added to 2 liters of water and the slurry stirred at room temperature for 8 hours. The solid product was collected by filtration, washed with water and air-dried. After recrystallization from aqueous ethanol, the product was melted at 233–234°.

Example 11.—Preparation of N-butyryl-4-(1,2,3,4,5,6,7,8 - octahydro - 3,3,6,6-tetramethyl-1,8-dioxo-9-xanthenyl)benzenesulfonamide Fifteen grams of 4-(1,2,3,4,5,6,7,8-octahydro-3,3,6,6-tetramethyl - 1,8 - dioxo - 9 - xanthenyl)benzenesulfonamide was suspended in 100 ml. of butyric anhydride and the mixture was heated at 150° for 6 hours. After cooling the clear solution was added to 3 liters of water containing 200 ml. of 40 percent sodium hydroxide. The mixture was stirred at room temperature for 3 hours and acidified with conc. hydrochloric acid to pH 6. The precipitated amorphous solid was collected by filtration, washed with water and redissolved in 3 liters of water containing 100 ml. of 40 percent sodium hydroxide. After acidification with conc. hydrochloric acid to pH 3, the precipitated solids were collected by filtration, washed with water and dried under reduced pressure at 50°. Recrystallization from benzene yielded white rosettes melting at 163–165° and containing 1 mole of benzene.

Recrystallization of this compound from ethyl acetate-petroleum ether yielded N - butyryl - 4 - (1,2,3,4,5,6,7,8-octahydro - 3,3,6,6 - tetramethyl-1,8-dioxo-9-xanthenyl)benzenesulfonamide free of solvent, M.P. 203–205°.

Example 12.—Preparation of N-benzoyl-4-(1,2,3,4,5,6,7,8 - octahydro - 3,3,6,6-tetramethyl-1,8-dioxo-9-xanthenyl)benzenesulfonamide To a solution of 12.9 g. of 4-(1,2,3,4,5,6,7,8-octahydro-3,3,6,6 - tetramethyl - 1,8 - dioxo-9-xanthenyl)benzenesulfonamide in 110 ml. of pyridine was added 9 g. of benzoyl chloride and the solution was refluxed for 5 hours. After removal of the solvent under reduced pressure, the residue was dissolved in acetone, the solution was filtered and evaporated to dryness under reduced pressure. To the residue was added 500 ml. of 3 N hydrochloric acid and the mixture was stirred overnight at room temperature. The solid product was collected by filtration and recrystallized from aqueous ethanol, M.P. 237–239°.

Example 13

The following premix formulation incorporating N-acetyl - 4 - (1,2,3,4,5,6,7,8-octahydro-3,3,6,6-tetramethyl-1,8-dioxo-9-xanthenyl)benzenesulfonamide is illustrative of anthelmintic formulations containing the novel compounds of this invention.

20 percent premix for animal use

| | Grams/kilo |
|---|---|
| N - acetyl - 4 - (1,2,3,4,5,6,7,8-octahydro-3,3,6,6-tetramethyl - 1,8 - dioxo-9-xanthenyl)benzenesulfonamide | 125 |
| Corn germ meal | 831 |
| Drew Oil 1400 | 44 |
| Total weight | 1000 |

Procedure (1) The corn germ meal was placed in a suitable mixer and while mixing, the Drew Oil 1400 was slowly added and thoroughly mixed.

(2) While mixing continuously the N-acetyl-4-(1,2,3,4,5,6,7,8 - octahydro - 3,3,6,6 - tetramethyl - 1,8 - dioxo-9 xanthenyl)benzenesulfonamide was slowly added and mixed until the mixture was homogenous.

(3) This premix was then added to a commercial poultry feed at the ratio of 2 lbs./ton to yield a ratio of 0.0125 percent drug, and thoroughly mixed.

(4) This medicated feed was used in the mash form, and it was also pelleted on a Sprout-Waldron Pellet Mill.

Amounts of the above premix may be added to the commercial feed to yield medicated levels ranging from 0.0025 percent to 0.05 percent. The commercial feeds to which this premix is added may be free of other medicaments or may contain other medicaments if the final mixture is compatible.

What is claimed is:

1. A compound selected from the group consisting of

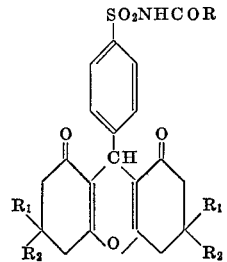

wherein R is lower alkyl or phenyl; and $R_1$ and $R_2$ are each independently selected from the group consisting of hydrogen and lower alkyl and pharmaceutically acceptable base salts thereof with alkali metal hydroxides.

2. A compound according to claim 1 wherein R, $R_1$ and $R_2$ are each methyl.

3. A compound according to claim 2 wherein R is ethyl and $R_1$ and $R_2$ are each methyl.

4. A compound according to claim 1 wherein R is propyl and $R_1$ and $R_2$ are each methyl.

5. A compound according to claim 1 wherein R is phenyl and $R_1$ and $R_2$ are each methyl.

6. A compound selected from the group consisting of

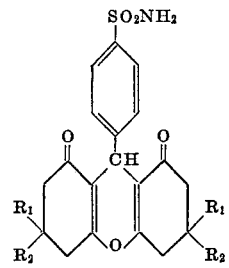

wherein $R_1$ and $R_2$ are each independently selected from the group consisting of hydrogen and lower alkyl and pharmaceutically acceptable base salts thereof with alkali metal hydroxides.

7. A compound according to claim 6 wherein $R_1$ and $R_2$ are methyl.

8. The process for the preparation of compounds of the formula

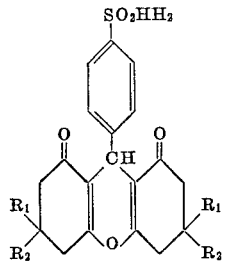

wherein $R_1$ and $R_2$ are each independently selected from the group consisting of hydrogen or lower alkyl which comprises reacting of 1,3-cyclohexanedione of the formula

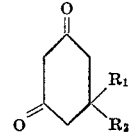

wherein $R_1$ and $R_2$ have the same significance as above with p-sulfamoylbenzaldehyde at a temperature between about room temperature and 100° C. in the presence of an acqueous solvent utilizing at least about 2 moles of the cyclohexanedione per mole of sulfamoylbenzaldehyde.

References Cited

UNITED STATES PATENTS 3,022,316   2/1962   Bestian _____ 260—335

HENRY R. JILES, *Primary Examiner.*

S. WINTERS, *Assistant Examiner.*

PO-1050
(5/69)

UNITED STATES PATENT OFFICE
CERTIFICATE OF CORRECTION

Patent No. 3,414,587                     Dated December 3, 1968

Inventor(s)   HANNS HANINA LEHR and MILAN MITROVIC

It is certified that error appears in the above-identified patent and that said Letters Patent are hereby corrected as shown below:

Column 4, line 45   "100 m."   should be:

100 ml.

Column 5, line 28   "product was melted"   should be:

product melted

Column 7, claim 8, lines 10-20    " $SO_2HH_2$ "

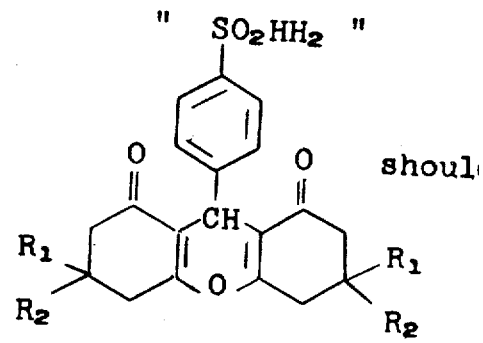

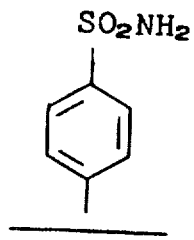

shoul

Column 8, line 1   "reacting of"   should be:

reacting a

PO-1050
(5/69)

UNITED STATES PATENT OFFICE
CERTIFICATE OF CORRECTION

Patent No. 3,414,587      Dated December 3, 1968

Inventor(s) HANNS HANINA LEHR and MILAN MITROVIC    PAGE - 2

It is certified that error appears in the above-identified patent and that said Letters Patent are hereby corrected as shown below:

Column 6, line 56, claim 3 "claim 2" should be:

claim 1

This certificate supercedes the Certificate of Correction issued May 19, 1970.

SIGNED AND
SEALED
AUG 25 1970

(SEAL)
Attest:

Edward M. Fletcher, Jr.
Attesting Officer

WILLIAM E. SCHUYLER, JR.
Commissioner of Patents